United States Patent Office 2,933,489
Patented Apr. 19, 1960

2,933,489

HEAVY METAL-CONTAINING DYESTUFFS

Walter Biedermann, Fabio Beffa, and Guido Schetty, Basel, Switzerland, assignors to J. R. Geigy A.-G., Basel, Switzerland, a Swiss firm No Drawing. Application January 21, 1958
Serial No. 710,176

Claims priority, application Switzerland January 26, 1956

6 Claims. (Cl. 260—145)

The invention concerns heavy metal-containing azo dyestuffs which contain a mono and a disazo dyestuff bound to co-ordinative hexavalent chromium. It also concerns processes for the production of such dyestuffs and their use for the dyeing of material containing protein such as leather, silk, wool, furs, as well as of synthetic polypeptide fibres such as Lanital, superpolyamide and superpolyurethane fibres.

It has been found that very valuable heavy-metal containing dyestuffs are obtained if a dicyclically co-ordinated, metal-containing azo dyestuff in which each dyestuff molecule is bound to co-ordinative hexavalent chromium, is added in a weakly acid, neutral or alkaline medium to a dicyclic metallising azo dyestuff, these azo dyestuffs being so chosen that the reaction product contains an unsulphonated monazo and a sulphonated disazo dyestuff each of the kind defined below bound in complex linkage to one and the same chromium atom.

The o.o'-dihydroxy azo dyestuffs are the preferred dicyclic metallising azo dyestuffs of our invention. However, also such o-hydroxy azo dyestuffs which contain in the o'-position a substituent which can be exchanged for the hydroxyl group or which can be converted into the hydroxyl group can be used in the production of the metal-containing dyestuffs used according to the present invention which contain a co-ordinative hexavalent chromium atom for each dyestuff molecule. Examples of such dyestuffs are o-hydroxy-o'-halogen azo dyestuffs or o-hydroxy-o'-alkoxy azo dyestuffs.

The metal complexes used according to the present invention containing a chromium atom bound in complex linkage to each dyestuff molecule are obtained by methods known per se, for example by reacting excess chromic salts in aqueous or organic solution at a raised temperature, possibly under pressure and preferably in an acid medium. The sulphonated, metallisable azo dyestuffs are metallised preferably in aqueous solution, the unsulphonated metallisable dyestuffs in higher boiling alcohols such as, e.g. ethylene glycol and monalkyl esters thereof at temperatures of from 90–150° C. Depending on the method of production and the reaction medium, the so-called 1:1 complex of a metallisable azo dyestuff, containing a chromium atom for each dyestuff molecule which shall be added to the metal-free azo dyestuff, can contain still further atoms or groups attached at the heavy metal atom. For example, aquo, acido, hydroxo complexes of the metal-containing dyestuffs can be formed and used. The 1:1 complex can even contain chelated attached atoms or groups which can be displaced by the dicyclically chelating second azo dyestuff, such as occurs for example in the salicylato or tartrato compounds of metal-containing monoazo dyestuffs containing one chromium atom to each dyestuff molecule.

In the present process the coupling products of diazotised 4-nitro-2-amino-1-hydroxybenzene compounds which may be further substituted in 6-position by halogen, lower alkyl, nitro or acylamino groups with hydroxynaphthalene compounds coupling in o-position to a hydroxyl group, are used as monoazo dyestuffs. Examples of useful disazo dyestuffs are the compounds formed from a diazotised 5-sulphophenylazo - 4 - methyl-2-amino-1-hydroxybenzene and naphthols coupling in o-position to a hydroxyl group. The naphthalene rings in the mono and disazo dyestuffs and the sulphophenyl radical of the disazo dyestuff can contain the substituents usual in azo dyestuffs, for example halogen, alkyl, alkoxy, nitro, acylamino, sulphonic acid amide, alkyl sulphonyl, aryl sulphonyl, acyl substituents. 2-hydroxynaphthalene is however the preferred coupling or end component of the monoazo as well as of the disazo dyestuff. It is advantageous if only one sulphonic acid group is present in the co-ordinated disazo dyestuff.

The metal-free azo dyestuff may be added to the metal-containing azo dyestuff in water or in a water-containing organic solvent. The addition is performed advantageously at medium temperatures, e.g. of 40–95° C. and in the presence of alkaline agents or agents which buffer the mineral acid, e.g. in the presence of sodium acetate, sodium carbonate, sodium hydroxide or in the presence of corresponding lithium, potassium or ammonium compounds. Low alcohols such as ethyl alcohol, ethylene glycol, ethylene glycol monomethyl or monoethyl ethers and amides of lower fatty acids such as formamide, dimethyl formamide, may be used as organic solvents. Under favourable conditions, the metal-free azo dyestuff is incorporated relatively quickly and completely.

It has further been found that with the instant selection of metallisable monoazo and disazo dyes it is not absolutely necessary to first manufacture in a separate process a so-called 1:1 chromium complex of one of the metallisable dyes and then to incorporate in a next step under favourable conditions the other metallisable dyestuff. It has been found that the desired product is predominantly formed and may easily be separated from undesired by-products if a so-called mix-metallisation is performed, e.g. if a mixture of substantially equivalent amounts of a metallisable sulphonated disazo dye and of a metallisable unsulphonated monoazo dye of the kind defined above is treated in water with substantially and equivalent amount of an appropriate agent giving off chromium. Without the intention of being fixed to any theory or even most probable explanation, we suppose that due to the different solubility in water and perhaps also to a different complex stability of the dyes used, a so-called 1:1 chromium complex is first formed, which, for example with an alkali metal or ammonium salt of disalicylato chromic acid as the metallising agent, will probably contain a colourless group attached to the chromium atom, viz. a salicyclic acid molecule.

This 1:1 complex forms a 2:1 complex with the other metal-free and sparingly soluble metallisable dyestuff. The desired metal-containing dyestuffs can be obtained from the aqueous solution by salting out and from an alcoholic solution by precipitation with water or by distilling off the organic solvent. The process according to the present invention enables deep greenish-black metal-containing dyestuffs to be produced; up to now no such shades could only be obtained with difficulty from monoazo dyestuffs. In addition it is also particularly advantageous that sulphonated heavy metal-containing textile dyestuffs can be produced which are distinguished by good neutral drawing power on to wool, very good wet fastness and especially a good fastness to acid milling of the wool dyeings, interesting deep shades and relatively very good fastness to light.

The new chromium-containing azo dyestuffs, which contain one sulphonic acid group in the form of the lithium, sodium, potassium, rubidium, caesium or ammonium salt, correspond to the general Formula I

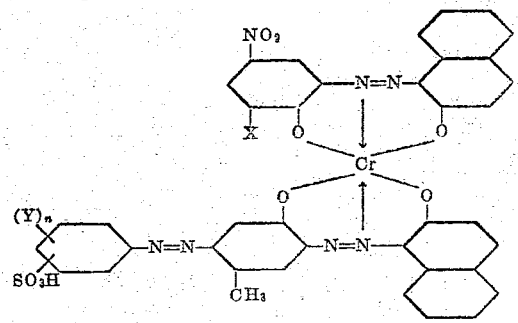

In this formula:

X represents hydrogen; halogen and if so preferably chlorine; lower alkyl and if so preferably methyl; acylamino and if so preferably acetylamino; or nitro;

Y represents hydrogen; or halogen, if so preferably chlorine; or lower alkyl and if so preferably methyl; lower alkoxy; or acylamino;

$n$ represents 1 or 2.

The water soluble textile dyestuffs according to the present invention which contain only one sulphonic acid group which confers a sufficient water solubility, are suitable not only for the dyeing of wool from a weakly alkaline, neutral to weakly acid bath in deep shades but are also suitable for the dyeing of leather, furs, casein, superpolyamide and superpolyurethane fibres. If desired they can also be used for the dyeing of lacquers and cellulose spinning masses.

The following examples illustrate the invention. Where not otherwise stated, parts are given as parts by weight and the temperatures are in degrees centigrade. The relationship of parts by weight to parts by volume is as that of kilogrammes to litres.

EXAMPLE 1

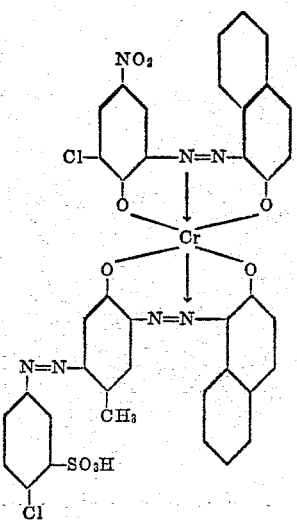

3.44 parts of the dyestuff from diazotised 4-nitro-6-chloro-2-amino-1-hydroxybenzene and 2-hydroxynaphthalene and 4.97 parts of the disazo dyestuff from diazotised 3-hydroxy - 4 - amino-6-methyl-4'-chloro-1.1'-azobenzene-3'-sulphonic acid and 2-hydroxynaphthalene are stirred in 200 parts by volume of water. At 85°, a solution of the sodium salt of disalicylato chromic acid (corresponding to 0.6 part of chromium) is added, the reaction is made weakly phenolphthalein alkaline by the addition of sodium carbonate and the whole is boiled until the complex formation is complete. The chromium-containing dyestuff is isolated by the addition of sodium chloride. After drying, the dyestuff is a dark powder which dyes wool from a neutral or weakly acid bath in greenish-black shades which have good fastness properties.

If in the above example the monoazo dyestuff is replaced by 3.54 parts of the monoazo dyestuff from diazotised 4.6-dinitro - 2 - amino-1-hydroxybenzene and 2-hydroxynaphthalene, then a dyestuff with similar properties is obtained.

The monoazo dyestuffs are obtained from 1-hydroxy-2-diazo-4-nitro- or -4.6-dinitrobenzene and the equivalent amount of 2-hydroxynapthalene, in an aqueous/alkaline medium in the cold. The disazo dyestuff is obtained by coupling 1-diazo-4-chlorobenzene-3-sulphonic acid and the equivalent amount of 1-hydroxy-2-amino-4-methylbenzene dissolved in water, the chlorohydrate being obtained on acid reaction in the presence of sodium thiosulphate in the cold, indirectly diazotising the aminoazo dyestuff obtained with sodium nitrite and hydrochloric acid in the cold and coupling with the equivalent amount of 2-hydroxynaphthalene in aqueous/caustic alkaline solution.

The mono and disazo dyestuffs used in the following examples and in the table are produced in an analogous manner.

EXAMPLE 2

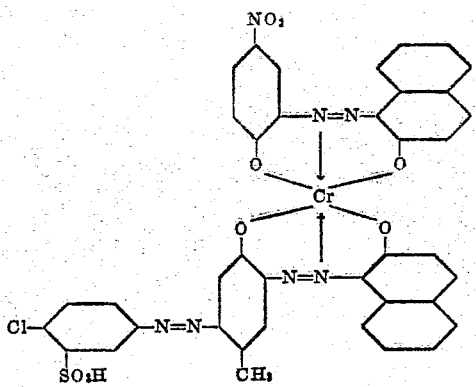

3.09 parts of the dyestuff from diazotised 4-nitro-2-amino-1- hydroxybenzene and 2-hydroxynaphthalene and 4.965 parts of the disazo dyestuff from diazotised 3-hydroxy - 4 - amino - 6 - methyl - 4' - chloro - 1.1' - azobenzene-3'-sulphonic acid and 2-hydroxynaphthalene are stirred in 150 parts of water. An aqueous solution of the sodium salt of disalicylato chromic acid (corresponding to 0.57 part of chromium) are added and the whole is boiled until the complex formation is complete. The dyestuff is salted out, filtered off and dried. It is a dark powder which dyes wool in olive-grey to black shades depending on the strength.

EXAMPLE 3

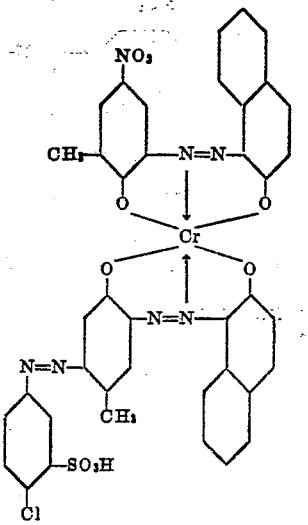

3.23 parts of the dyestuff from diazotised 4-nitro-6-methyl-2-amino-1-hydroxybenzene and 2-hydroxynaphthalene and 4.97 parts of the disazo dyestuff from diazotised 3 - hydroxy - 4 - amino - 6 - methyl - 4' - chloro - 1.1'-azobenzene-3'-sulphonic acid and 2-hydroxynaphthalene are stirred in 200 parts by volume of water and the whole is boiled with a solution of the sodium salt of disalicylato chromic acid (corresponding to 0.6 part of chromium), until the metallisation is complete. The chromium-containing dyestuff is then precipitated by the addition of sodium chloride, filtered off and dried. It is a dark powder which dyes wool from a neutral or weakly acid bath in fast black shades.

If in the above example, the disazo dyestuff is replaced by 4.62 parts of the disazo dyestuff from diazotised 3-hydroxy - 4 - amino - 6 - methyl - 1.1' - azobenzene - 3'-sulphonic acid or 3-hydroxy-4-amino-6-methyl-1.1'-azobenzene-4'-sulphonic acid and 2-hydroxynaphthalene, then dyestuffs with similar properties are obtained.

EXAMPLE 4

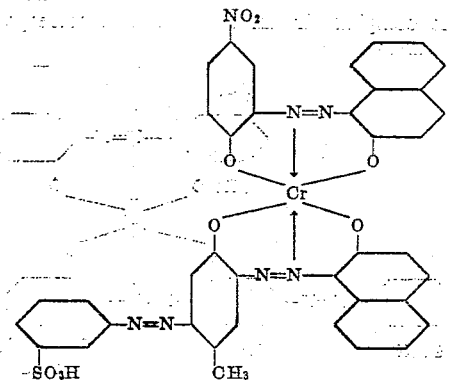

47.6 parts of the disazo dyestuff 1-aminobenzene-3-sulphonic acid→2 - methoxy - 5 - methyl - 1 - aminobenzene→2-hydroxynaphthalene are stirred in 200 parts by volume of formamide and 42 parts by volume of glycol monomethyl ether. 4 parts of glacial acetic acid and 36 parts of chromic acetate (corresponding to 7.8 parts of chromium) are added and the whole is heated for 4½ hours at 130–135°. A deep green-blue solution is obtained which is poured at 50–60° into a mixture of 850 parts by volume of 20% sodium chloride solution and 85 parts by volume of 10 N-hydrochloric acid. The chromium-containing dyestuff precipitates. It is filtered off and washed with about 800 parts by volume of 20% sodium chloride solution.

The damp, chromium-containing dye paste is then pasted with 29.6 parts of the monoazo dyestuff from diazotised 4-nitro-2-amino-1-hydroxybenzene and 2-hydroxynaphthalene in 3600 parts of water, 30 parts by volume of 10 N-caustic soda lye are added and the whole is boiled for 6 hours. Sodium chloride is added to the hot mixture and the dyestuff is filtered off. After drying, it is a grey-black powder which dyes wool from an acetic acid bath in greenish-black shades.

EXAMPLE 5

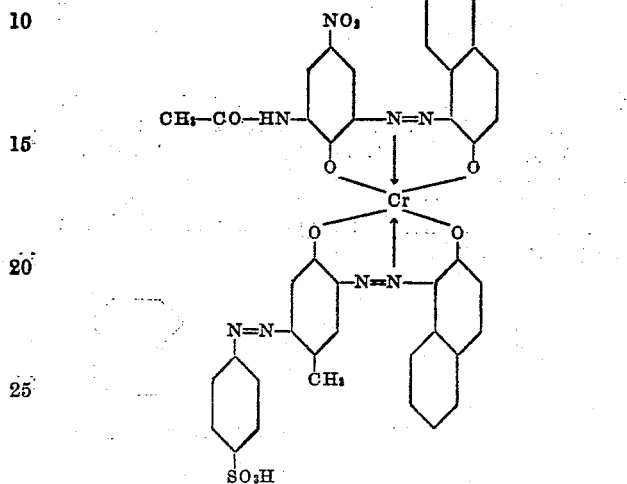

3.66 parts of the monoazo dyestuff from diazotised 4-nitro-6-acetylamino-2-amino-1-hydroxybenzene and 2-hydroxynaphthalene and 4.62 parts of the disazo dyestuff from diazotised 3-hydroxy-4-amino-6-methyl-1.1'-azobenzene-4'-sulphonic acid and 2-hydroxynaphthalene are stirred in 200 parts of water. A solution of the sodium salt of disalicylato chromic acid (corresponding to 0.6 part of chromium) is added at 85°, the reaction is made weakly phenolphthalein alkaline by the addition of anhydrous sodium carbonate and the whole is boiled until the complex formation is complete. The chromium-containing dyestuff is salted out with sodium chloride, filtered off and dried. It is a dark powder which dyes wool in black shades which have good fastness properties.

The following table contains further dyestuffs according to the present invention which are obtained by the methods described in the above examples.

Table

| No. | monoazo dye | disazo dye | Dyeing on wool |
|---|---|---|---|
| 1 | 3.44 pts. 6-chloro-4-nitro-2-amino-1-hydroxybenzene ⟶ 2-hydroxynaphthalene. | 4.62 pts. 3-hydroxy-4-amino-6-methyl-1.1'-azobenzene-3'-sulphonic acid ⟶ 2-hydroxynaphthalene. | black. |
| 2 | ....do.... | 4.62 pts. 3-hydroxy-4-amino-6-methyl-1.1'-azobenzene-4'-sulphonic acid ⟶ 2-hydroxynaphthalene. | Do. |
| 3 | 3.54 pts. 4.6-dinitro-2-amino-1-hydroxybenzene ⟶ 2-hydroxynaphthalene. | ....do.... | Do. |
| 4 | ....do.... | 4.62 pts. 3-hydroxy-4-amino-6-methyl-1.1'-azobenzene-3'-sulphonic acid ⟶ 2-hydroxynaphthalene. | Do. |
| 5 | 3.09 pts. 4-nitro-2-amino-1-hydroxybenzene ⟶ 2-hydroxynaphthalene. | 4.62 pts. 3-hydroxy-4-amino-6-methyl-1.1'-azobenzene-4'-sulphonic acid ⟶ 2-hydroxynaphthalene. | Do. |
| 6 | ....do.... | 4.9 pts. 3-hydroxy-4-amino-6.4'.6'-trimethyl-1.1'-azobenzene-2'-sulphonic acid ⟶ 2-hydroxynaphthalene. | Do. |
| 7 | 3.66 pts. 4-nitro-6-acetylamino-2-amino-1-hydroxybenzene ⟶ 2-hydroxynaphthalene. | 4.97 pts. 3-hydroxy-4-amino - 6 - methyl - 4' - chloro-1.1'-azobenzene-3'-sulphonic acid ⟶ 2-hydroxynaphthalene. | Do. |
| 8 | ....do.... | 4.62 pts. 3-hydroxy-4-amino-6-methyl-1.1'-azobenzene-3'-sulphonic acid ⟶ 2-hydroxynaphthalene. | Do. |

EXAMPLE 6

0.4 part of the metal-containing dyestuff according to Example 2 are dissolved in 400 parts by volume of water. 10 parts of previously well wetted wool are entered at 50°, 0.5 part of ammonium acetate are added and the bath is brought to the boil within 45 minutes. Dyeing is performed at the boil while moving the goods well for 1½ hours whereupon the wool is rinsed and dried. The wool which has been dyed black is distinguished by good fastness properties.

Dyeing can be performed with the other dyestuffs mentioned in the examples and in the table in an analogous manner. Very fast black wool dyeings are also obtained.

This application is a continuation-in-part of application Serial No. 635,084, filed January 22, 1957.

What we claim is:

1. A complex chromium compound corresponding to the general formula

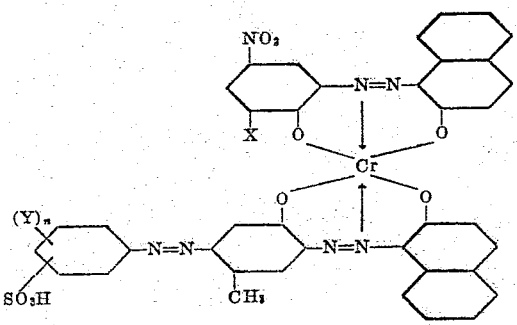

wherein:

X is a member selected from the group consisting of H, Cl, $CH_3$, $NO_2$, acetylamino, and
Y is a member selected from the group consisting of H, $CH_3$ and Cl,
$n$ is a whole number from 1 to 2.

2. The complex chromium compound corresponding to the formula

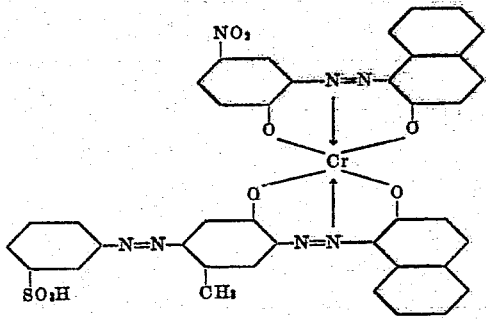

3. The complex chromium compound corresponding to the formula

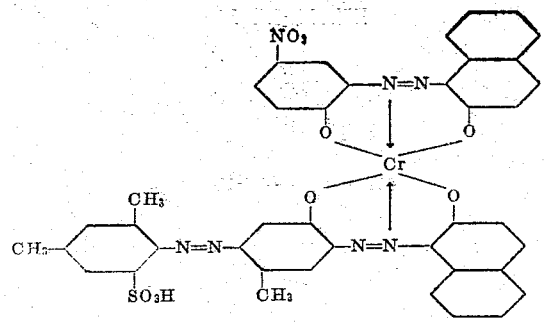

4. The complex chromium compound corresponding to the formula

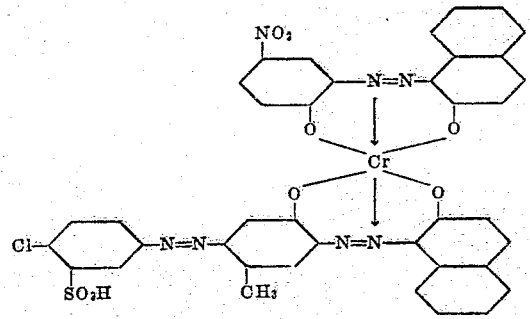

5. The complex chromium compound corresponding to the formula

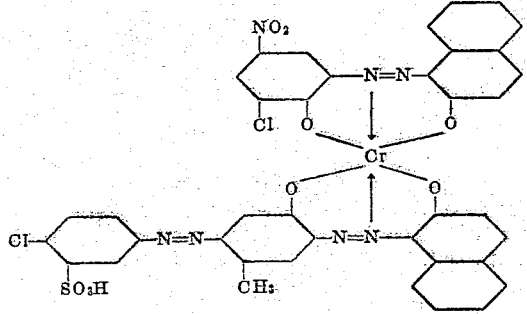

6. The complex chromium compound corresponding to the formula

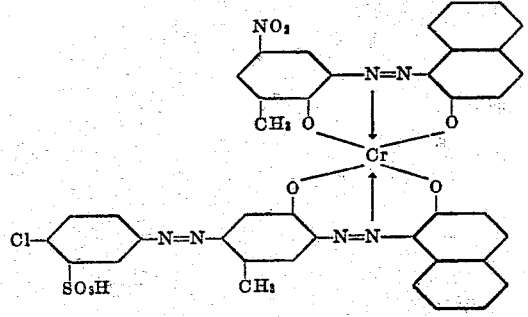

References Cited in the file of this patent

UNITED STATES PATENTS 2,775,581   Neier et al.   Dec. 25, 1956